Patented Aug. 22, 1950

2,519,498

UNITED STATES PATENT OFFICE 2,519,498

DYEING OF CELLULOSE DERIVATIVE TEXTILE MATERIALS WITH AN ACID DYE IN A SWELLING SOLUTION FOLLOWED BY WASHING WITH AN AQUEOUS SALT SOLUTION

Henry Charles Olpin and Edmund Stanley, Spondon, near Derby, England, assignors to Celanese Corporation of America, a corporation of Delaware No Drawing. Application November 6, 1946, Serial No. 708,192. In Great Britain November 22, 1945

7 Claims. (Cl. 8—59)

This invention relates to the colouring of textile materials consisting of or containing fibres of cellulose acetate or other cellulose esters or ethers, and particularly the colouration of these materials with the aid of acid dyes.

Cellulose acetate fibres can be coloured by impregnating them with a solution of an acid or other dye in an aqueous lower alcohol of at least 55% strength by weight and containing an inorganic swelling agent, particularly sodium, potassium, or ammonium thiocyanate. The term "swelling agent" is used as including substances which, in the form of a mixture with water, are capable of swelling cellulose acetate or other cellulose esters or ethers. In the case of these dye liquids, and other dye liquids capable of swelling cellulose acetate or other cellulose ester or ether materials, it is usually possible, without serious loss of dye, to wash off the impregnated material with water without first drying the material. In the case of some dyes, however, the loss of colour on washing off without first drying the material can be serious, though once the material is freed from the alcoholic liquid the dye in the material is resistant to removal by washing, and indeed, as resistant to removal as dyes which can withstand washing without first drying the material impregnated with the dye liquid. The green sulphonated triaryl methane dye (Color Index No. 735) is a dye of the kind which, once incorporated in cellulose acetate fibre, is exceedingly resistant to removal by washing with water. On the other hand if it is applied to cellulose acetate fibres as a solution in aqueous alcohol containing sodium thiocyanate, and the material is washed without first drying the material, practically the whole of the dye is removed. It is therefore impracticable to employ this otherwise valuable dye for the colouring of cellulose acetate fibres by the method outlined above.

According to the present invention the loss of colour on washing off with water after impregnation with the dye liquid is very greatly reduced by effecting the first wash with an aqueous solution of an inorganic salt. The salt employed should not be such as will accentuate the swelling action of water on the cellulose acetate or other cellulose ester or ether of the textile fibres. Preferably, moreover, the salt should be such as will reduce the solubility in water of the dye employed. Sodium chloride is particularly suitable, although other water-soluble inorganic salts, for example, sodium sulphate, can be employed. In the case of sodium chloride or sodium sulphate the concentration of the aqueous solution can be from 10% by weight up to that of saturation.

After washing the material with the salt solution it may thereafter be washed with plain water without material removal of dye from the fibres. It appears that the salt affects aggregation of the dye molecules or particles and renders the dye much less easily removable from the fibres. Another action of the salt solution seems to be to remove the alcohol and other swelling agent from the fibres and to restore the latter to their normal unswollen condition more rapidly or effectively than water alone and so still further reduce the tendency for the dye to be removed from the fibre by the wash liquor.

The organic liquid containing the dye is preferably an ethyl alcohol of 55–70% strength by weight, and may be made up from methylated spirits, which consists substantially of ethyl alcohol together with small proportions of methyl alcohol and water. Preferably, however, the liquid medium consists of this aqueous ethyl alcohol containing a thiocyanate or other inorganic swelling agent and preferably also a proportion of acetic acid or other lower aliphatic acid as described in U. S. applications S. Nos. 507,154, now Patent 2,428,835, and 540,321, now abandoned, filed October 21, 1943 and June 14, 1944 respectively.

Other liquids which may be employed are aqueous solutions of acetone of 20 to 40% strength by weight and in general mixtures of water with water-miscible organic liquids of such strength as to be capable of swelling the cellulose acetate, and in particular to be capable of swelling it to at least the same extent as aqueous ethyl alcohol of 55 per cent strength at ordinary temperatures. Thus aqueous solutions of methyl alcohol, propyl alcohol, iso-propyl alcohol or other lower aliphatic alcohol can be used, preferably in conjunction with a thiocyanate or other inorganic swelling agent.

The impregnation of the textile material with the dye liquid is conveniently carried out with the aid of a padding mangle. Other devices capable of incorporating in the material a predetermined proportion of a liquid may, however, be employed. For example, loose textile fibre or yarn in the form of hanks may be immersed in the dye liquid and thereafter centrifuged until it contains only the proportion of dye liquid requisite to give the desired shade. In the case of colouring a textile fabric, the padding mangle is the most convenient means for impregnating the material with the requisite proportion of dye liquid.

As regards the dyes which may be employed, the new process is of particular merit when it is required to apply acid dyes to cellulose acetate fibres, and in particular acid dyes of the type of the green dye referred to above, which are readily removed from cellulose acetate when the latter is washed with water while in a swollen condition. These latter dyes are of the type which are aggregated to but a small degree in aqueous solution. The washing with salt solution, is, however, an advantage even in the case of acid dyes which are aggregated to a substantially greater degree than the green dye referred to above, for example, acid dyes which, when applied to wool, yield dyeings of good fastness to milling. The acid dyes may be such as have substantially no affinity for cellulose acetate when applied from aqueous baths by conventional dyeing methods, or they may be acid dyes of the type which have a certain affinity for cellulose acetate when applied from aqueous baths. The latter type of dye includes certain sulphonic acid dyes and also a number of dyes containing an acid sulphate group, and in particular a number of dyes which are acid sulphuric esters of azo, anthraquinone and other water insoluble dyes containing hydroxy alkyl groups.

The invention is primarily concerned with the colouring of cellulose acetate textile fibres, though it may be applied to the colouring of fibres of other cellulose esters and ethers, for example, cellulose formate, propionate, or butyrate, or ethyl cellulose, or again it may be applied to a mixed material containing fibres of cellulose acetate or other cellulose ether and fibres of another material, e. g. cotton, silk, wool or regenerated cellulose. According to the particular material and to the dyestuff employed, these other materials may be left uncoloured or they may be coloured in the same shade as the cellulose ester or ether fibre or in different shades. The cellulose ester or ether fibres can be in the form of continuous filaments or in the form of short fibres as in the staple fibre.

The invention is illustrated by the following example:

A mixture is made up consisting of 750 cc. methylated spirits
250 cc. water
30 cc. acetic acid and to this solution is added 20 gm. of sodium thiocyanate and 10 gm. of the green sulphonated triaryl methane dye (Color Index No. 735), the whole being stirred, filtered if necessary, and the temperature adjusted to between 20° C.–250° C. If desired the acetic acid may be omitted and the sodium thiocyanate replaced by the ammonium salt.

Cellulose acetate woven fabric is padded in the clear green solution and run from the mangle into a cold 20% aqueous solution of sodium chloride, then into plain water to remove the salt, and dried. The fabric is coloured a deep green which is fast to washing, whereas if washed off in plain water after padding only a very weak colouration is obtained.

Having described our invention, what we desire to secure by Letters Patent is:

1. In a process for the coloration of textile material selected from the group consisting of cellulose esters and cellulose ethers by impregnating the material with a solution of a dye in a liquid containing a substantial proportion of a water miscible organic liquid, and which is a swelling agent for the cellulose derivative, the said dye being an acid dye which is aggregated in water to a small degree at most, has substantially no affinity for the cellulose derivative when applied thereto as a solution in water and is readily removed from the swollen material by washing with water, the step of de-swelling the dye-impregnated material and fixing the dye therein by washing the impregnated material with an aqueous solution of an inorganic salt, the said salt being substantially without swelling action on the cellulose derivative and being capable of reducing the solubility of the acid dye in water.

2. In a process for the coloration of cellulose acetate textile material by impregnating the material with a solution of a dye in a liquid containing a substantial proportion of a water miscible organic liquid, and which is a swelling agent for the cellulose acetate, the said dye being an acid dye which is aggregated in water to a small degree at most, has substantially no affinity for the cellulose acetate when applied thereto as a solution in water and is readily removed from the swollen material by washing with water, the step of de-swelling the dye-impregnated material and fixing the dye therein by washing the impregnated material with an aqueous solution of an inorganic salt, the said salt being substantially without swelling action on the cellulose acetate and being capable of reducing the solubility of the acid dye in water.

3. Process according to claim 2, wherein the inorganic salt is sodium chloride.

4. Process according to claim 2, wherein the inorganic salt is sodium sulphate.

5. In a process for the coloration of cellulose acetate textile material by impregnating the material with a solution of the green acid dye, Color Index No. 735, in a liquid containing a substantial proportion of a water miscible organic liquid and which is a swelling agent for the cellulose acetate, the step of de-swelling the dye-impregnated material and fixing the dye therein by washing the impregnated material with an aqueous solution of an inorganic salt, the said salt being substantially without swelling action on the cellulose acetate and being capable of reducing the solubility of the dye in water.

6. In a process for the coloration of cellulose acetate textile material by impregnating the material with a solution of an acid dye in aqueous ethyl alcohol of 55–70 per cent strength by weight containing a thiocyanate, the said dye being an acid dye which is aggregated in water to a small degree at most, has substantially no affinity for the cellulose acetate when applied thereto as a solution in water, and is readily removed from the swollen material by washing with water, the step of de-swelling the dye-impregnated material and fixing the dye therein by washing the impregnated material with an aqueous solution of an inorganic salt, the said salt being substantially without swelling action on the cellulose acetate, and being capable of reducing the solubility of the acid dye in water.

7. A process for the coloration of cellulose acetate textile material with the green acid dye, Color Index No. 735, which comprises impregnating the material with a solution of the dye in aqueous ethyl alcohol of 55–70 per cent strength by weight and containing a thiocyanate, and thereafter de-swelling the material and fixing the dye therein by washing the impregnated material with an aqueous solution of sodium chloride.

HENRY CHARLES OLPIN.
EDMUND STANLEY.

REFERENCES CITED

The following references are of record in the file of this patent:

UNITED STATES PATENTS

| Number | Name | Date |
|---|---|---|
| 2,428,835 | Croft | Oct. 14, 1947 |

OTHER REFERENCES

C. E. Mullin: "Acetate Silk and Its Dyes," 1927, pages 168, 169, 170.

Certificate of Correction

Patent No. 2,519,498 — August 22, 1950

HENRY CHARLES OLPIN ET AL.

It is hereby certified that error appears in the printed specification of the above numbered patent requiring correction as follows:

Column 3, line 67, for "20° C.–250° C." read *20° C.–25° C.*;

and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*